United States Patent
Kajiyama (10) Patent No.: US 9,876,409 B2
(45) Date of Patent: Jan. 23, 2018

(54) INNER-ROTOR MOTOR WITH UPPER AND LOWER BRACKETS PRESS-FIT WITH THE STATOR CORE, AND A CIRCUIT BOARD

(71) Applicant: Nidec Corporation, Kyoto (JP)

(72) Inventor: Shinji Kajiyama, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 362 days.

(21) Appl. No.: 14/551,471

(22) Filed: Nov. 24, 2014

(65) Prior Publication Data
US 2015/0180301 A1 Jun. 25, 2015

(30) Foreign Application Priority Data

Dec. 20, 2013 (JP) ................................. 2013-264680

(51) Int. Cl.
*H02K 5/16* (2006.01)
*H02K 5/15* (2006.01)
(Continued)

(52) U.S. Cl.
CPC ............... *H02K 5/161* (2013.01); *H02K 5/15* (2013.01); *H02K 11/33* (2016.01); *H02K 11/40* (2016.01);
(Continued)

(58) Field of Classification Search
CPC .... H02K 2211/03; H02K 11/33; H02K 11/40; H02K 11/03; H02K 5/00; H02K 5/04;
(Continued)

(56) References Cited

U.S. PATENT DOCUMENTS 3,497,735 A * 2/1970 Fritz ........................ H02K 5/15
29/419.2
5,119,466 A * 6/1992 Suzuki ..................... H02K 9/22
310/68 R
(Continued)

FOREIGN PATENT DOCUMENTS

CN 2272164 Y 1/1998
CN 201436773 U 4/2010
(Continued)

OTHER PUBLICATIONS

STIC EIC 2800 Search Report 541086 by John DiGeronimo.*
Furukawa et al., "Inner-Rotor Motr", U.S. Appl. No. 14/267,034, filed May 1, 2014.

*Primary Examiner* — Bernard Rojas
*Assistant Examiner* — Maged Almawri
(74) *Attorney, Agent, or Firm* — Keating & Bennett, LLP (57) ABSTRACT

An inner-rotor motor includes a shaft, a rotor magnet, a stator arranged radially outside of and opposite to the rotor magnet, and upper and lower brackets arranged to hold upper and lower bearings. The upper bracket includes an upper cylindrical cover press fitted to an outer circumference of a stator core from above, an upper bearing holding portion configured to hold the upper bearing, and a top plate portion arranged to join the upper cylindrical cover to the upper bearing holding portion. The lower bracket includes a lower cylindrical cover press fitted to the outer circumference of the stator core from below, a lower bearing holding portion arranged to hold the lower bearing, and a bottom plate portion arranged to join the lower cylindrical cover to the lower bearing holding portion. Each of the upper and lower brackets is fixed to the stator core through press fitting.

11 Claims, 5 Drawing Sheets

(51) Int. Cl.
*H02K 11/33* (2016.01)
*H02K 11/40* (2016.01)
*H02K 5/22* (2006.01)
*H02K 29/08* (2006.01)

(52) U.S. Cl.
CPC .............. *H02K 5/22* (2013.01); *H02K 5/225* (2013.01); *H02K 29/08* (2013.01); *H02K 2211/00* (2013.01); *H02K 2211/03* (2013.01)

(58) Field of Classification Search
CPC ............ H02K 5/16; H02K 5/22; H02K 5/225; H02K 5/15; H02K 5/161; H02K 5/128; H02K 29/08; H02K 2211/00
USPC .............................................. 310/89, 49, 71
See application file for complete search history.

(56) References Cited

U.S. PATENT DOCUMENTS

| | | | | |
|---|---|---|---|---|
| 6,867,518 | B2* | 3/2005 | Kurosawa | H02K 5/1732 310/179 |
| 7,064,462 | B2* | 6/2006 | Hempe | B23D 45/16 173/217 |
| 2004/0217669 | A1 | 11/2004 | Fujii et al. | |
| 2006/0071563 | A1 | 4/2006 | Fujii | |
| 2006/0279150 | A1* | 12/2006 | Kojima | H02K 3/524 310/91 |
| 2010/0052453 | A1* | 3/2010 | Kamogi | H02K 1/2733 310/156.05 |
| 2011/0169358 | A1* | 7/2011 | Furukawa | H02K 3/522 310/89 |
| 2011/0304225 | A1* | 12/2011 | Terashita | H02K 5/04 310/49.37 |
| 2012/0043862 | A1* | 2/2012 | Furukawa | H02K 1/278 310/68 B |
| 2013/0043748 | A1* | 2/2013 | Mizukami | H02K 11/0089 310/71 |
| 2013/0301229 | A1* | 11/2013 | Yanagi | H05K 1/14 361/752 |
| 2015/0123501 | A1* | 5/2015 | Jang | H02K 5/08 310/43 |

FOREIGN PATENT DOCUMENTS

| | | |
|---|---|---|
| CN | 202602468 U | 12/2012 |
| JP | 52-079505 U1 | 12/1975 |
| JP | 57-143863 U1 | 3/1981 |
| JP | 07-059280 A | 3/1995 |
| JP | 08-126285 A | 5/1996 |
| JP | 09-154250 A | 6/1997 |
| JP | 11-220860 A | 8/1999 |
| JP | 2003-088081 A | 3/2003 |
| JP | 2004-229429 A | 8/2004 |
| JP | 2005-020851 A | 1/2005 |
| JP | 2010-246203 A | 10/2010 |
| JP | 2012-060811 A | 3/2012 |
| JP | 2012-191688 A | 10/2012 |
| JP | 2012-222867 A | 11/2012 |
| JP | 2013-099094 A | 5/2013 |
| JP | 2013-211126 A | 10/2013 |
| WO | WO2013187585 | * 12/2013 |

\* cited by examiner

INNER-ROTOR MOTOR WITH UPPER AND LOWER BRACKETS PRESS-FIT WITH THE STATOR CORE, AND A CIRCUIT BOARD

BACKGROUND OF THE INVENTION

1. Field of the Invention

The present invention relates to an inner-rotor motor. In particular, the present invention relates to an improvement in a motor in which a stator is arranged radially outside of and opposite to a rotor magnet.

2. Description of the Related Art

In a common inner-rotor motor, a rotor magnet is fixed to a shaft, and a stator is arranged radially outside the rotor magnet. In addition, bearings arranged to support the shaft are arranged on an upper side and a lower side of the rotor magnet, and each of the bearings is supported by a bracket arranged to cover the stator. The shape of the stator depends on desired characteristics of the motor, such as power and torque. Therefore, different brackets should be used for different motors having different desired characteristics, and it is impossible to use a common bracket for the different motors to achieve a reduction in costs of the motors.

Meanwhile, a motor is known in which both ends of a stator are held by two brackets, and these brackets are fixed and fastened by a fixing screw (see JP-A 11-220860, for example). Adoption of a structure described in JP-A 11-220860 makes it possible to use the same brackets for different motors whose stators have different axial dimensions.

However, the motor described in JP-A 11-220860 has a problem in that use of the fixing screw is necessary to fix and fasten the brackets, and the number of parts is increased. In addition, the motor described in JP-A 11-220860 has a problem in that fixing screws having different lengths should be used in accordance with the axial dimension of the stator. Furthermore, the motor described in JP-A 11-220860 has a problem in that a space in which the fixing screw is inserted should be secured in the stator, and this leads to a deterioration in the magnetic property of a stator core and a decrease in an energy efficiency of the motor.

An interspace between the brackets depends on the axial dimension of the stator, and is affected by an error in the shape of the stator. As a result, in the case where a sleeve bearing is used to support the shaft, a groove to which a stopper washer is fixed is often defined in the shaft, and the error in the shape of the stator affects a gap between the stopper washer and the sleeve bearing. As a result, play between the stopper washer and the sleeve bearing is changed. That is, in the case where axial play between the stopper washer and the sleeve bearing is too small, a shaft loss may be increased. Meanwhile, in the case where the axial play between the stopper washer and the sleeve bearing is too great, a rotor may become shaky.

SUMMARY OF THE INVENTION

Preferred embodiments of the present invention provide an inner-rotor motor having high efficiency and a low cost.

An inner-rotor motor according to a preferred embodiment of the present invention includes an upper bearing and a lower bearing; a shaft supported by the upper and lower bearings to be rotatable about a rotation axis extending in a vertical direction; a rotor magnet directly or indirectly fixed to the shaft; a stator arranged radially outside of and opposite to the rotor magnet with a gap intervening therebetween; an upper bracket arranged to hold the upper bearing; and a lower bracket arranged to hold the lower bearing. The stator includes a stator core, an insulator, and windings wound around the stator core with the insulator intervening therebetween. The upper bracket includes an upper cylindrical cover press fitted to an outer circumference of the stator core from above, an upper bearing holding portion arranged to extend in an axial direction and arranged to hold the upper bearing, and a top plate portion arranged to join the upper cylindrical cover and the upper bearing holding portion to each other. The lower bracket includes a lower cylindrical cover press fitted to the outer circumference of the stator core from below, a lower bearing holding portion arranged to extend in the axial direction and arranged to hold the lower bearing, and a bottom plate portion arranged to join the lower cylindrical cover and the lower bearing holding portion to each other. At least one of the upper and lower bearings is an oil-impregnated sintered bearing. Each of the upper and lower brackets is fixed to the stator core through press fitting.

The above-described structure makes it possible to use the same brackets for different motors whose stators have different axial dimensions, and eliminates a need to use a fixing screw to fasten the brackets. This prevents an increase in the number of parts, and enables shared use of parts which leads to a reduction in production costs. In addition, since an insert hole for the fixing screw is not necessary, an improvement in the magnetic property of the stator is achieved, and an improvement in an energy efficiency of the motor is achieved.

Preferred embodiments of the present invention make it possible to provide an inner-rotor motor having high efficiency and a low cost.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. For the sake of convenience in description, a direction parallel or substantially parallel to a central axis J1 of a motor is herein referred to as a vertical direction. However, this definition of the vertical direction should not be construed to restrict in any way the orientation of a motor according to any preferred embodiment of the present invention when in use. In addition, the direction parallel or substantially parallel to the central axis J1 of the motor is referred to simply by the term "axial direction", "axial", or "axially", radial directions centered on the central axis J1 are referred to simply by the term "radial direction", "radial", or "radially", and a circumferential direction about the central axis J1 is referred to simply by the term "circumferential direction", "circumferential", or "circumferentially".

Figure 1:
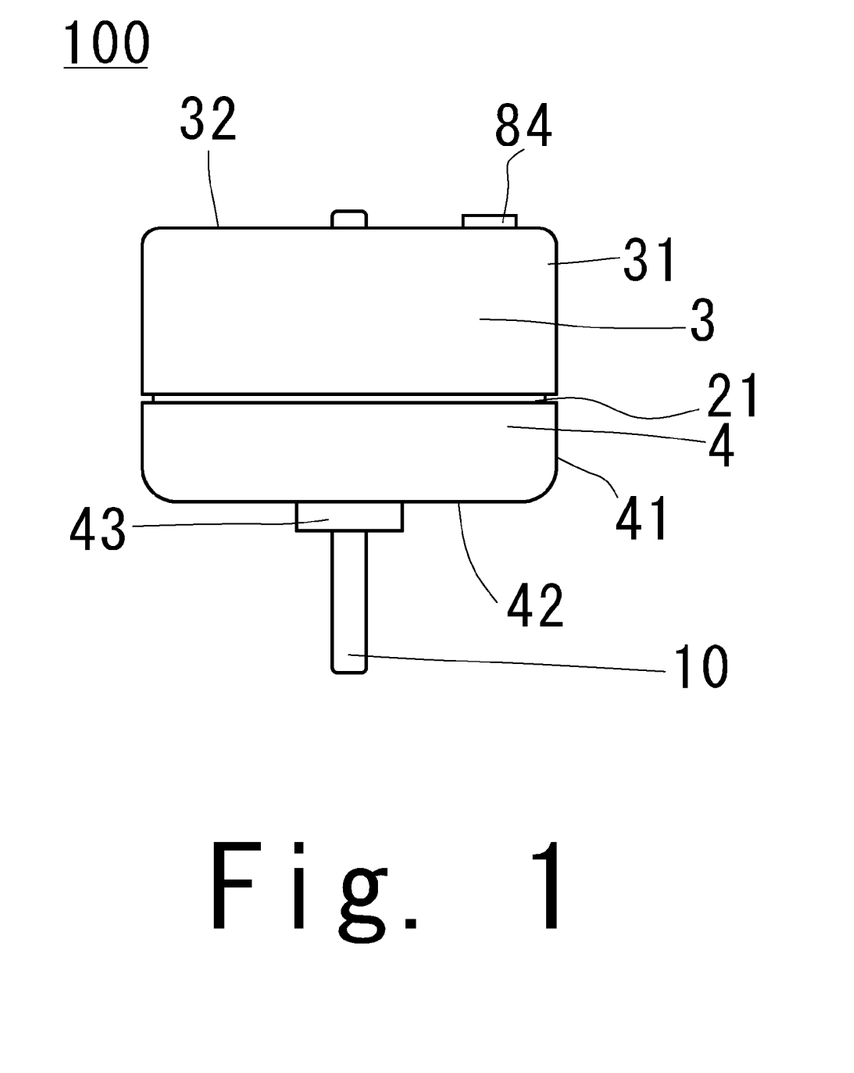
FIG. 1 is an external perspective view of a motor 100 according to a first preferred embodiment of the present invention.
Figure 2:
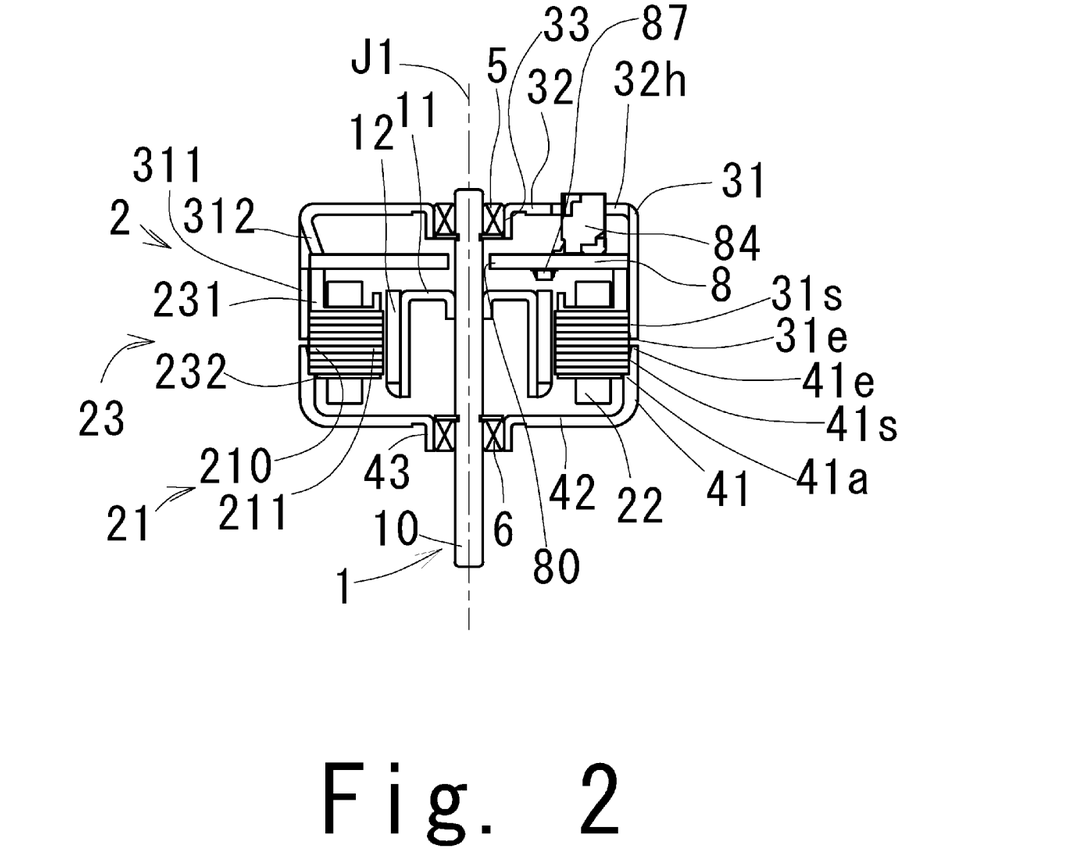
FIG. 2 is a cross-sectional view of the motor 100 illustrated in FIG. 1.
Figure 3:
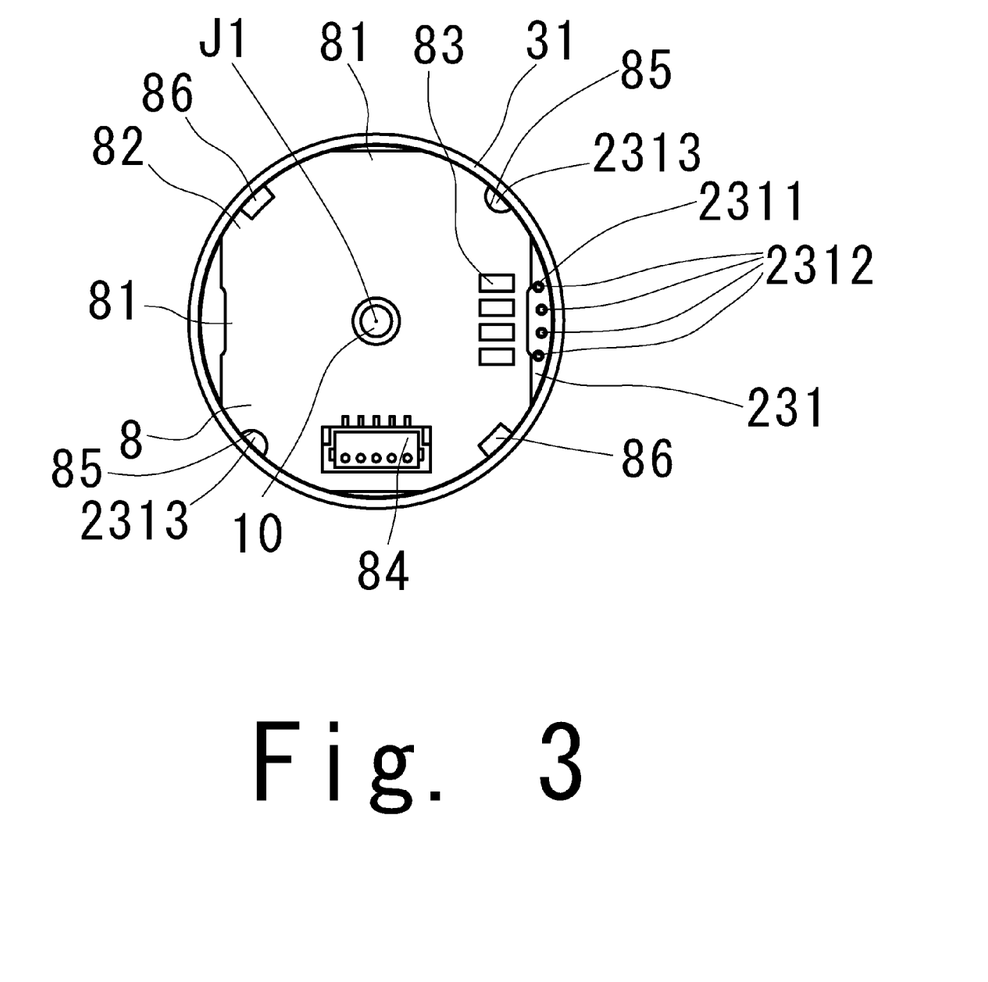
FIG. 3 is a horizontal cross-sectional view of the motor 100 illustrated in FIG. 1 taken along a plane above a circuit board 8 and below a top plate portion 32.

FIGS. 1, 2, and 3 are each a diagram illustrating an exemplary structure of a motor 100 according to a first preferred embodiment of the present invention. FIG. 1 is an external view of the motor 100. FIG. 2 is a cross-sectional view of the motor 100, illustrating a section of the motor 100 taken along a plane including the central axis J1. FIG. 3 is a horizontal cross-sectional view of the motor 100 taken along a plane above a circuit board 8 and below a top plate portion 32.

Referring to FIGS. 1 to 3, the motor 100 is preferably an inner-rotor motor in which a rotor magnet 12 is fixed to a shaft 10, and a stator 2 is arranged radially outside and opposite to the rotor magnet 12 with a gap intervening therebetween. An upper bearing 5 and a lower bearing 6 arranged to support the shaft 10 are arranged on both axial sides of the rotor magnet 12. Moreover, an upper bracket 3 and a lower bracket 4 are preferably arranged on both axial sides of the stator 2, and the upper bracket 3 and the lower bracket 4 are arranged to hold the upper bearing 5 and the lower bearing 6, respectively. At least one of the upper bearing 5 and the lower bearing 6 is a sleeve bearing, that is, an oil-impregnated sintered bearing. According to the present preferred embodiment, both the upper bearing 5 and the lower bearing 6 are preferably sleeve bearings, for example.

The motor 100 is preferably used as a driving source for a drive apparatus, such as, for example, a household electrical appliance, an office machine, a medical appliance, or an automobile. The motor 100 includes a stationary portion fixed to a frame of the drive apparatus, and a rotating portion 1 rotatably supported by the stationary portion. The rotating portion 1 includes the shaft 10, a rotor holder 11, and the rotor magnet 12. Meanwhile, the stationary portion includes the stator 2, the upper bracket 3, the lower bracket 4, the upper bearing 5, the lower bearing 6, and the circuit board 8. These components will be described in detail below.

The shaft 10 is a columnar or substantially columnar member arranged to extend in an axial direction (i.e., the vertical direction). The shaft 10 is supported by the upper and lower bearings 5 and 6, and is arranged to rotate about the central axis J1. A lower end portion of the shaft 10 preferably includes a projecting portion arranged to project downward below the lower bracket 4. This projecting portion is used as an output shaft and is joined to a driving portion of the drive apparatus. Note that it may be arranged such that an upper end portion of the shaft 10 projects upward above the upper bracket 3, and such that the projecting upper end portion is used as the output shaft and is joined to the driving portion of the drive apparatus. An outer circumferential surface of the shaft 10 preferably includes two grooves which are spaced from each other in the axial direction. A stop washer (shown but not labeled) arranged to make contact with the upper bearing 5 or the lower bearing 6 to prevent the upper bearing 5 or the lower bearing 6 from moving further in the axial direction when the rotating portion 1 has moved in the axial direction is preferably fixed in each of these grooves.

The rotor holder 11 is a member arranged radially inside the stator 2 and arranged to rotate together with the shaft 10.

The rotor holder 11 according to the present preferred embodiment is in or substantially in the shape of a covered cylinder.

The rotor magnet 12 is preferably a cylindrical permanent magnet, and is fixed to an outer circumferential surface of the rotor holder 11. A radially outer surface of the rotor magnet 12 defines a pole surface arranged radially opposite the stator 2. This pole surface is polarized such that north pole surfaces and south pole surfaces alternate with each other in a circumferential direction. Note that the rotor magnet 12 may alternatively be directly fixed to the shaft 10 without use of the rotor holder 11, if so desired. Also note that a plurality of plate-shaped permanent magnets may alternatively be used in place of the rotor magnet 12.

The stator 2 is an armature of the motor 100, and preferably includes a stator core 21, coils 22, and an insulator 23. The stator 2 is cylindrical or substantially cylindrical in shape, and is arranged radially outside the rotor magnet 12. The stator 2 is arranged radially opposite an outer circumferential surface of the rotor magnet 12 with a gap intervening therebetween.

The stator core 21 is preferably defined by laminated steel sheets, i.e., magnetic steel sheets, such as, for example, silicon steel sheets, placed one upon another in the axial direction. The stator core 21 preferably includes an annular core back 210 and a plurality of magnetic pole teeth 211 arranged to project radially inward from the core back 210.

Each coil 22 is preferably a winding wound around a separate one of the magnetic pole teeth 211 of the stator core 21 with the insulator 23 intervening therebetween. Once electric drive currents are supplied to the coils 22, radial magnetic flux is generated around each of the magnetic pole teeth 211, each of which is a magnetic core. A circumferential torque is thus produced between the magnetic pole teeth 211 and the rotor magnet 12, so that the rotating portion 1 is caused to rotate about the central axis J1.

The insulator 23 is preferably a member made of a resin and arranged to provide electrical isolation between the stator core 21 and each coil 22. The insulator 23 according to the present preferred embodiment, for example, preferably includes an upper insulator 231 and a lower insulator 232 arranged on separate axial sides of the stator core 21 to hold the stator core 21. The coils 22 are wound around the respective magnetic pole teeth 211 of the stator core 21 with the insulator intervening therebetween, so that the insulator 23 is fixed to the stator core 21.

The upper insulator 231 preferably includes pin support portions 2311, each of which is open in the axial direction. A binding pin 2312, which will be described below, is inserted or press fitted into each pin support portion 2311. According to the present preferred embodiment, the number of pin support portions 2311 and the number of binding pins 2312 are both preferably four, for example. Note, however, that this is not essential to the present invention, and that the number of pin support portions 2311 and the number of binding pins 2312 may both be less than four or more than four. According to the present preferred embodiment, the four pin support portions 2311 and the four binding pins 2312 are preferably provided for common and three phases, i.e., a U phase, a V phase, and a W phase, respectively. A conducting wire drawn out from the stator 2 is bound around each binding pin 2312.

In addition, the upper insulator 231 preferably includes board positioning portions 2313 each of which is arranged to project in the axial direction. Moreover, a surface of the upper insulator 231 which is axially opposed to the upper bracket 3, which will be described below, includes a board support surface 2314 arranged to be in contact with a lower surface of the circuit board 8, which will be described below.

The upper bracket 3 is preferably a metallic member press fitted and fixed to the stator 2, and arranged to hold the upper bearing 5. The upper bracket 3 preferably is, for example, obtained by subjecting a metal sheet, such as a galvanized steel sheet, to press working. In addition, the upper bracket 3 possesses electrical conductivity. The upper bracket 3 preferably includes an upper cylindrical cover 31, the top plate portion 32, and an upper bearing holding portion 33.

The upper cylindrical cover 31 preferably is in the shape of a cylinder extending in the axial direction, with the top plate portion 32 arranged at an upper end thereof and an opening arranged at a lower end thereof. The upper cylindrical cover 31 preferably includes a cylindrical portion 311 including a cylindrical inner circumferential surface and arranged to be in contact with the stator core 21, and a board contact portion 312 arranged axially above a lower end of the cylindrical portion 311, having an inside diameter smaller than that of the cylindrical portion 311, and arranged to be in contact with the circuit board 8. The cylindrical portion 311 is press fitted to an outer circumference of the stator core 21 from above, and is thus fixed to the stator core 21. In addition, an inner circumferential surface of the upper cylindrical cover 31 includes, at a lower end thereof, a tapered portion 31s which is radially angled. The diameter of the tapered portion 31s is arranged to increase toward a lower end 31e of the upper cylindrical cover 31. This contributes to preventing an outer circumferential surface of the stator core 21 from being damaged when an upper end of the stator core 21 is press fitted into the upper cylindrical cover 31.

The board contact portion 312 is defined by a portion of the upper cylindrical cover 31 bent radially inward. More specifically, the board contact portion 312 is preferably defined by a portion of the cylindrical portion 311 cut and pressed radially inward. That is, the board contact portion 312 is continuous with the cylindrical portion 311 at an axially upper end thereof, and extends axially downward from the axially upper end thereof. When the cylindrical portion 311 is press fitted to the outer circumference of the stator core 21, the board contact portion 312 makes contact with the circuit board 8, which will be described below, so that axial positioning of the upper bracket 3 is accomplished. Moreover, as a result of a contact of the board contact portion 312 with the circuit board 8, the circuit board 8 is held and fixed between the insulator 23 and the upper bracket 3.

Figure 4:
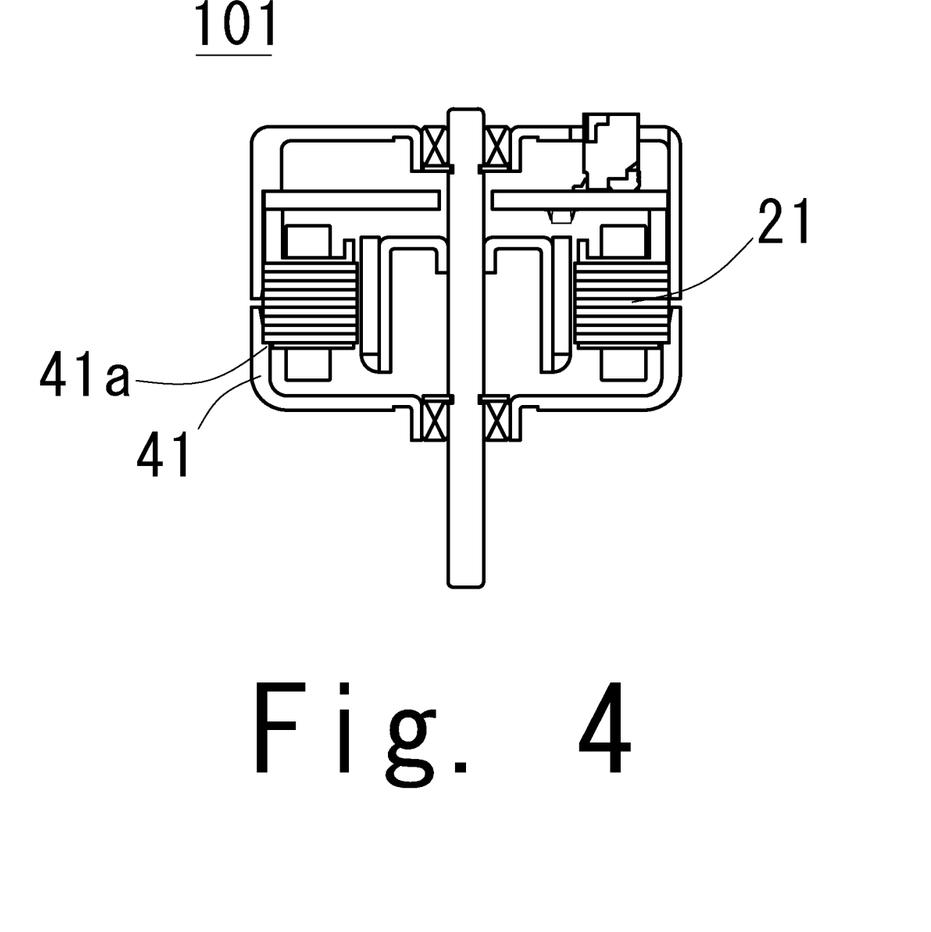
FIG. 4 is a cross-sectional view illustrating an exemplary structure of a motor 101 according to a preferred embodiment of the present invention.

Although the board contact portion 312 according to the present preferred embodiment is preferably defined by bending the portion of the upper cylindrical cover 31, this is not essential to the present invention. For example, referring to FIG. 4, in a motor 101 according to another preferred embodiment of the present invention, an upper decreased diameter portion having an inside diameter smaller than that of the cylindrical portion 311 may be arranged above the cylindrical portion 311 of the upper cylindrical cover 31, and the upper decreased diameter portion may be used as the board contact portion 312.

Figure 5:
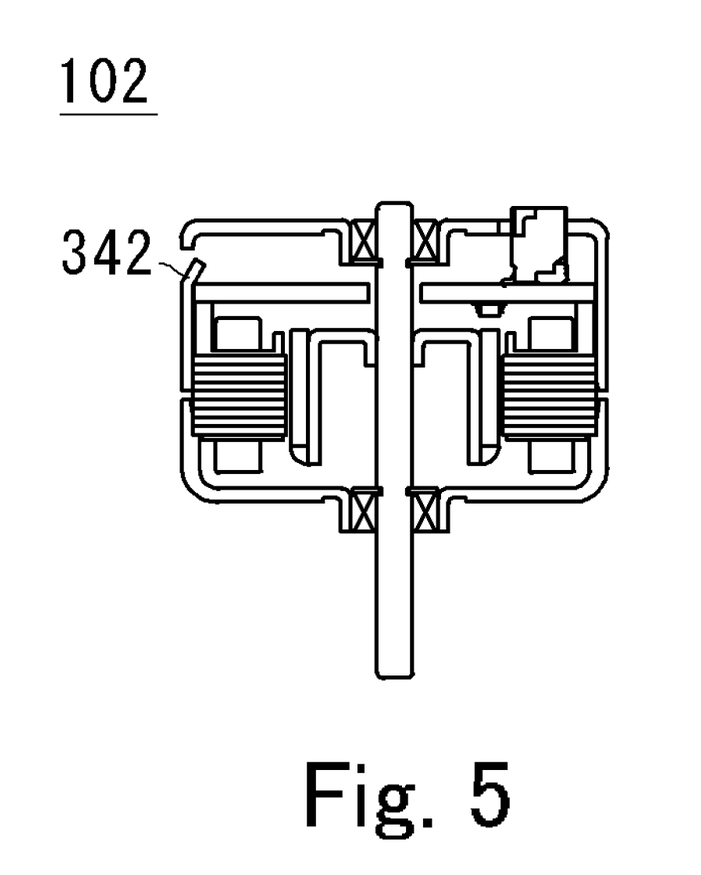
FIG. 5 is a cross-sectional view illustrating an exemplary structure of a motor 102 according to a preferred embodiment of the present invention.

Moreover, referring to FIG. 5, in a motor 102 according to yet another preferred embodiment of the present invention, a board contact portion 342 may be arranged to extend axially upward from an axially lower end thereof continuous with the cylindrical portion 311.

Furthermore, the board contact portion 312 may not necessarily be in direct contact with the circuit board 8. Instead, the board contact portion 312 may be arranged to be in indirect contact with the circuit board 8 with another member intervening therebetween. Even in this case, the positioning of the upper bracket 3 is capable of being easily and reliably accomplished.

From the standpoint of positioning the upper bracket 3, the stator 2 and the circuit board 8 may be regarded as a stator assembly. In this case, the upper bracket 3 may not necessarily be in contact with the circuit board 8. That is, the upper bracket 3 may be arranged to be in contact with a portion of the upper insulator 231, for example. The axial positioning of the upper bracket 3 preferably is accomplished by arranging the upper bracket 3 to be in contact with an upper surface of the stator assembly.

The top plate portion 32 preferably is a plate-shaped or substantially plate-shaped body arranged to extend radially inward from the upper end of the upper cylindrical cover 31 to reach an upper end of the upper bearing holding portion 33. That is, the top plate portion 32 is in the shape of an annular plate, and is arranged to surround the upper bearing holding portion 33. In addition, the top plate portion 32 preferably includes a connector opening portion 32h. The connector opening portion 32h is an opening arranged to expose a connector 84. Although the connector opening portion 32h according to the present preferred embodiment is arranged to be open in the axial direction in the top plate portion 32, this is not essential to the present invention. For example, the connector 84 may be radially oriented, with a portion of the connector opening portion 32h arranged in the upper cylindrical cover 31.

The upper bearing holding portion 33 preferably is a cylindrical member extending in the axial direction from the top plate portion 32. An outer circumferential surface of the upper bearing 5 is preferably press fitted inside the upper bearing holding portion 33.

The lower bracket 4 is preferably a metallic member press fitted and fixed to the stator 2, and arranged to hold the lower bearing 6. The lower bracket 4 preferably is, for example, obtained by subjecting an aluminum sheet to press working. The lower bracket 4 preferably includes a lower cylindrical cover 41, a bottom plate portion 42, and a lower bearing holding portion 43.

The lower cylindrical cover 41 preferably is in the shape of a cylinder extending in the axial direction, with the bottom plate portion 42 arranged at a lower end thereof and an opening arranged at an upper end thereof. The lower cylindrical cover 41 is preferably press fitted to the outer circumference of the stator core 21 from below, and is thus fixed to the stator core 21. An inner circumferential surface of the lower cylindrical cover 41 preferably includes, at an upper end thereof, a tapered portion 41s which is radially angled. The diameter of the tapered portion 41s is arranged to increase toward an upper end 41e of the lower cylindrical cover 41. This contributes to preventing the outer circumferential surface of the stator core 21 from being damaged when a lower end of the stator core 21 is press fitted into the lower cylindrical cover 41.

A positioning portion 41a is arranged to determine an extent to which the stator core 21 is press fitted into the lower bracket 4. The positioning portion 41a is provided as a circumferentially extending shoulder defined in the lower cylindrical cover 41. The inside diameter of the lower cylindrical cover 41 changes at the positioning portion 41a, and the inside diameter of the lower cylindrical cover 41 is greater above the positioning portion 41a than below the positioning portion 41a. Therefore, it is possible to press fit the stator core 21 into the lower bracket 4 to a predetermined extent by press fitting the stator core 21 into the lower bracket 4 until a lower end of the outer circumference of the stator core 21 makes contact with the positioning portion 41a.

Note that the positioning portion 41a may be omitted, if so desired. Also note that positioning of the stator 2 with respect to the lower bracket 4 may alternatively be accomplished by arranging the insulator 23 to be in contact with the positioning portion 41a. However, the positioning is accomplished with greater precision when the stator core 21 is arranged to be in contact with the positioning portion 41a without the insulator 23 intervening therebetween.

The bottom plate portion 42 is preferably a plate-shaped or substantially plate-shaped body arranged to extend radially inward from a lower end of the lower cylindrical cover 41 to reach an upper end of the lower bearing holding portion 43. That is, the bottom plate portion 42 is in the shape of an annular plate, and is arranged to surround the lower bearing holding portion 43. A lower end surface of the bottom plate portion 42 is used as an attachment surface to attach the motor 100 to the drive apparatus (not shown), and the bottom plate portion 42 includes a plurality of attachment holes.

The lower bearing holding portion 43 is preferably a cylindrical portion arranged to extend in the axial direction from an inner circumferential end of the bottom plate portion 42. An outer circumferential surface of the lower bearing 6 is press fitted inside the lower bearing holding portion 43. The lower bearing holding portion 43 is thus arranged to hold the lower bearing 6.

The circuit board 8 is a board on which an electronic circuit arranged to supply the drive currents to the coils 22 is mounted. The circuit board 8 is fixed by the insulator 23. The circuit board 8 preferably has a quadrilateral or substantially quadrilateral shape. In more detail, the circuit board 8 is preferably roughly in the shape of a rectangle, including straight portions 81, which define four sides of the quadrilateral, and circular arc portions 82, which are four chamfered corners of the quadrilateral. The roughly rectangular shape of the circuit board 8 contributes to increasing the number of circuit boards 8 obtained from one sheet. This in turn contributes to improving a yield of a material. Although the shape of the circuit board 8 preferably is quadrilateral or substantially quadrilateral according to the present preferred embodiment, this is not essential to the present invention. The shape of the circuit board 8 may be any shape, such as, for example, a polygon having five or more sides, a triangle, a half moon, or an ellipse, as long as the yield is thus improved.

A through hole 80 for the shaft 10 is defined in the circuit board 8.

Land portions 83 are arranged in an upper surface of the circuit board 8. The number of land portions 83 preferably is four, for example, according to the present preferred embodiment. The four conducting wires drawn out from the stator are bound around the four binding pins 2312, respectively. Each binding pin 2312 is connected to a separate one of the land portions 83 through a lead wire (not shown). In addition, the connector 84 is mounted on the circuit board 8. The connector 84 is a structure to detachably connect the circuit board 8 to an external device, and is preferably arranged opposite to the connector opening portion 32h of the upper bracket 3. The connector 84 is connected to an external power supply to supply power to the circuit board 8. This makes it possible to supply the drive currents to the coils 22 through the circuit board 8.

Moreover, a control IC may be mounted on the circuit board 8. The control IC mounted on the circuit board 8 would be able to control drive of the motor 100.

Recessed positioning portions 85, each of which is recessed radially inward, are preferably arranged in the circular arc portions 82 of the circuit board 8. According to the present preferred embodiment, the recessed positioning portions 85 are arranged in two of the four circular arc portions 82 which are on a diagonal line with respect to the shape of the circuit board 8. The board positioning portions 2313 of the upper insulator 231 and the recessed positioning portions 85 are arranged at corresponding positions, and the board positioning portions 2313 of the upper insulator 231 are inserted into the recessed positioning portions 85 to position the circuit board 8.

In addition, a ground pattern 86 is arranged on the circuit board 8. A portion of the ground pattern 86 is arranged opposite to the board contact portion 312. In FIG. 3, the portion arranged opposite to the board contact portion 312 is depicted as the ground pattern 86. At the portion depicted in FIG. 3, a copper foil of the ground pattern 86 is exposed. According to the present preferred embodiment, a lower surface of the board contact portion 312 is arranged to be in contact with the ground pattern 86. Grounding of the circuit board 8 is thus established. That is, the ground for the circuit board 8 is established when any one of the upper bracket 3 and the lower bracket 4 is grounded. Meanwhile, in the case where none of the upper bracket 3 and the lower bracket 4 is grounded, the ground pattern 86 preferably is connected to the connector 84 to be grounded to an external location.

In addition, a magnetic sensor 87 is arranged on the lower surface of the circuit board 8 to detect rotation of the rotating portion 1.

The magnetic sensor 87 is a sensor arranged to detect a rotational position of the rotor magnet 12. The magnetic sensor 87 is arranged opposite to an upper end of the rotor magnet 12. A Hall element, for example, is preferably used as the magnetic sensor 87.

Various components of the motor 100 according to the present preferred embodiment have been described above. Hereinafter, relationships between some of these components and action and effects of these relationships will be described in detail.

In the motor 100 according to the present preferred embodiment, the stator core 21 and each of the upper and lower brackets 3 and 4 are preferably fixed to each other through press fitting. More specifically, the upper bracket 3 with the upper bearing 5 held thus is press fitted to the outer circumference of the stator core 21 from above, while the lower bracket 4 with the lower bearing 6 held thus is press fitted to the outer circumference of the stator core 21 from below.

Adoption of the above-described arrangement allows the stator 2 and each of the upper and lower brackets 3 and 4 to be fixed to each other to define a united body with the stator core 21 held between the upper and lower brackets 3 and 4.

Meanwhile, in the case of a known motor described in JP-A 11-220860, a stator is held between two brackets, and a fixing screw passing through the stator is used to fasten the brackets. This known motor has a problem in that the fixing screw is necessary to fasten the brackets, and this results in an increase in the number of parts. In addition, the known motor has a problem in that fixing screws having different lengths should be used depending on the axial dimension of the stator. Furthermore, the known motor has a problem in that a space in which the fixing screw is inserted should be secured in the stator, and this leads to a deterioration in the magnetic properties of a stator core and a decrease in efficiency of the motor.

In contrast, the motor 100 according to the present preferred embodiment does not require the use of fixing screws because the stator core 21 and each of the upper and lower brackets 3 and 4 are fixed to each other through press fitting, and a reduction in the number of parts is achieved. Moreover, in the case of the motor 100 according to the present preferred embodiment, it is not necessary to secure the space in which the fixing screw is inserted, and this prevents a deterioration in magnetic property of the stator core 21, and achieves an improvement in an energy efficiency of the motor 100.

Moreover, the upper and lower brackets 3 and 4 are spaced away from each other. That is, a lower end of the upper bracket 3 and an upper end of the lower bracket 4 are arranged axially opposite each other with a gap intervening therebetween, and a portion of an outer circumferential surface of the stator 2 is exposed through this gap. This allows efficient dispersion of heat from the stator 2, and leads to an additional improvement in the efficiency of the motor.

The axial dimension of the lower bracket 4 is preferably arranged to be smaller than the axial dimension of the upper bracket 3.

The sum of the axial dimension of a region where the upper bracket 3 is press fitted to the stator core 21 and the axial dimension of a region where the lower bracket 4 is press fitted to the stator core 21 is arranged to be greater than the axial dimension of a region where the stator core 21 is exposed. In addition, an axial middle of the region where the stator core 21 is exposed is arranged at an axial level lower than that of an axial middle of the stator core 21.

In addition, in the motor 100 according to the present preferred embodiment, the positioning portion 41a, which is arranged to determine the extent to which the stator core 21 is press fitted into the lower bracket 4, is included in the lower cylindrical cover 41 of the lower bracket 4, and the lower end of the outer circumference of the stator core 21 is arranged to be in contact with the positioning portion 41a. This makes it possible to fix the extent to which the stator core 21 is press fitted into the lower cylindrical cover 41.

Fixing the extent to which the stator core 21 is press fitted into the lower cylindrical cover 41 of the lower bracket 4 makes it possible to fasten the lower bracket 4 to the stator 2 with a fixed strength.

Note that, in each of the above-described preferred embodiments, a method of fixing each of the upper and lower brackets 3 and 4 to the stator 2 is not limited to press fitting, but may also be, for example, a combination of press fitting and adhesion. Also note that each of the upper and lower brackets 3 and 4 may be fixed to the stator 2 through welding, for example. In short, each of the upper and lower brackets 3 and 4 may be fixed to the stator 2 by any number of a variety of methods without use of a screw or the like, as long as the axial positions of each of the upper and lower brackets 3 and 4 relative to the stator 2 are capable of being determined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inner-rotor motor comprising:
   an upper bearing and a lower bearing;
   a shaft supported by the upper and lower bearings to be rotatable about a rotation axis extending in a vertical direction;
   a rotor magnet directly or indirectly fixed to the shaft;
   a stator arranged radially outside of and opposite to the rotor magnet with a gap intervening therebetween;
   an upper bracket arranged to hold the upper bearing; and
   a lower bracket arranged to hold the lower bearing; wherein
   the stator includes a stator core, an insulator, and windings wound around the stator core with the insulator intervening therebetween;
   the upper bracket includes an upper cylindrical cover press fitted to an outer circumference of the stator core from above, an upper bearing holding portion arranged to extend in an axial direction and arranged to hold the upper bearing, and a top plate portion arranged to join the upper cylindrical cover and the upper bearing holding portion to each other;
   the lower bracket includes a lower cylindrical cover press fitted to the outer circumference of the stator core from below, a lower bearing holding portion arranged to extend in the axial direction and arranged to hold the lower bearing, and a bottom plate portion arranged to join the lower cylindrical cover and the lower bearing holding portion to each other;
   at least one of the upper and lower bearings is an oil-impregnated sintered bearing;
   each of the upper and lower brackets is fixed and press-fit to the stator core;
   a surface of the insulator which is axially opposed to the upper bracket includes a board support surface arranged to be in contact with a lower surface of the circuit board; and
   an upper surface of the circuit board is arranged to be in direct contact with the upper bracket;
   the upper cylinder cover includes:
      a cylinder portion press fitted to the stator core; and
      a board contact portion in direct contact with the upper surface of the circuit board;
   the circuit board includes a ground pattern arranged therein; and
   the ground pattern is directly electrically connected to the board contact portion at a portion of the circuit board which is oppesed to the board contact portion.

2. The inner-rotor motor according to claim 1, wherein the lower bracket has an axial dimension smaller than an axial dimension of the upper bracket.

3. The inner-rotor motor according to claim 1, wherein a sum of an axial dimension of a region where the upper bracket is press fitted to the stator core and an axial dimension of a region where the lower bracket is press fitted to the stator core is configured to be greater than an axial dimension of a region where the stator core is exposed.

4. The inner-rotor motor according to claim 1, wherein an axial middle of the region where the stator core is exposed is arranged at an axial level lower than an axial middle of the stator core.

5. The inner-rotor motor according to claim 1, wherein the upper cylindrical cover includes:
   an upper decreased diameter portion arranged axially above the cylindrical portion, and
   having an inside diameter smaller than an inside diameter of the cylindrical portion; and
   a lower portion of the upper decreased diameter portion defines the board contact portion.

6. The inner-rotor motor according to claim 1, wherein the upper bracket is obtained by press working; and the     board contact portion is a circumferential portion of the upper cylindrical cover bent in a radial direction.

7. The inner-rotor motor according to claim 6, wherein the board contact portion is arranged to extend downward from an upper end thereof continuous with the cylindrical portion.

8. inner-rotor motor according to claim 1, further comprising a stator assembly including the stator and a circuit board arranged above the stator, wherein the upper bracket is in contact with an upper surface of the stator assembly.

9. The inner-rotor motor according to claim 8, wherein an outside shape of the circuit board in a plan view includes a straight line.

10. The inner-rotor motor according to claim 9, wherein the circuit board has a polygonal or substantially polygonal shape in a plan view.

11. The inner-rotor motor according to claim 9, wherein a gap is defined between the straight line of the circuit board and the upper bracket;

the insulator includes a pin support portion defined therein; and     the gap includes a binding pin arranged therein.

* * * * *